United States Patent
Chylinski et al.

(10) Patent No.: US 9,626,174 B2
(45) Date of Patent: Apr. 18, 2017

(54) CANCELLING DEVICE OVER THE AIR SOFTWARE UPDATE

(71) Applicant: CELLCO PARTNERSHIP, Basking Ridge, NJ (US)

(72) Inventors: Kathleen J. Chylinski, Bridgewater, NJ (US); Snehal B. Desai, Old Bridge, NJ (US); Stephen Kolanowski, Keller, TX (US); Bernard J. Guarino, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 244 days.

(21) Appl. No.: 13/863,278

(22) Filed: Apr. 15, 2013

(65) Prior Publication Data

US 2014/0310701 A1 Oct. 16, 2014

(51) Int. Cl.
*G06F 9/445* (2006.01)

(52) U.S. Cl.
CPC ..................... *G06F 8/65* (2013.01)

(58) Field of Classification Search
CPC ........................................... G06F 8/65
USPC ........................................ 717/173
See application file for complete search history.

(56) References Cited

U.S. PATENT DOCUMENTS

| | | | | |
|---|---|---|---|---|
| 5,008,814 A | * | 4/1991 | Mathur | 709/221 |
| 7,886,200 B1 | * | 2/2011 | Hernacki et al. | 714/48 |
| 8,321,858 B1 | * | 11/2012 | Marmaros et al. | 717/173 |
| 2004/0098715 A1 | * | 5/2004 | Aghera et al. | 717/173 |
| 2007/0027506 A1 | * | 2/2007 | Stender | G06F 19/3412 607/60 |
| 2009/0241100 A1 | * | 9/2009 | Sakurai et al. | 717/170 |
| 2010/0131084 A1 | * | 5/2010 | Van Camp | G06F 8/65 700/86 |
| 2011/0265075 A1 | * | 10/2011 | Lee | 717/171 |
| 2013/0036402 A1 | * | 2/2013 | Mutisya | G06F 11/3688 717/124 |

* cited by examiner

*Primary Examiner* — John Chavis

(57) ABSTRACT

A method and system are provided for providing a controlled software update to a group of computing devices. A server distributes a software update over the air to a first group of computing devices, through a wireless communication network. The first group of computing devices is monitored for successful installation of the software update. Upon determining that the software update is subject to a problem or potential problem, a second group of computing devices is identified based on the monitoring of the first group of computing devices. A software update cancellation message is sent through the wireless communication network to the second group of computing devices, instructing the second group of computing devices to cancel the software update in a way that is silent to the user of each respective computing device.

20 Claims, 8 Drawing Sheets

CANCELLING DEVICE OVER THE AIR SOFTWARE UPDATE

BACKGROUND

In recent years, updating software of a computing device Over The Air (OTA) has become increasingly business critical. Software executed by a computing device includes application programs that are used to perform useful end-user functions, or system software that manages and integrates a computing device's capabilities, such as the operating system (OS). A Software Update (SU) is sometimes performed to provide an upgrade (e.g., introduce new features and/or functionalities) or to fix some issues in the application program (e.g., software problems). Such SU's are frequently provided OTA via a mobile network.

For example, a Mobile Service provider or carrier provides communication service to many customers. The customers may own different manufacturer models of computing devices that are compatible with their network. The computing devices may include portable handsets, smartphones, tablet computers, personal digital assistants, or laptops, or even machine-machine interface devices. There are often campaigns to update the software OTA for a group of computing devices (e.g., a particular make and/or model). These SU campaigns may be initiated by the Service Provider or a third party software provider, collectively referred to herein as "provider." Such updates typically occur in two stages: (1) download of the software through the carrier network, and (2) installation. The download may occur in the background without knowledge of the user of the computing device. For example, a remote server provides the SU to the computing device OTA. The SU is typically stored in the memory of the computing device. The subsequent installation typically involves some user acknowledgment and/or control of the installation through a user interface of the computing device.

Problems arise when an incorrect or defective SU is sent to a computing device having a particular make (e.g., manufacturer) and/or model. For example, some issues may have not been discovered during software testing that could negatively impact customers with particular computing device configuration. Historically, upon a provider learning of a potential problem, the approach was usually to remove the SU from continued distribution and simply wait for the consequences of distributing the potentially problematic SU. For example, the user of the computing device may report a computing device failure related to the SU, upon which the carrier may initiate a roll-back of the SU or different software to all devices, including those that currently function properly. In another example, instead of waiting for an SU failure report from the customer, the provider may notify users of affected devices that a potential problem exists and that the user should not install the SU or should initiate a roll-back. Such notifications may be ignored by the user, which may ultimately lead to malfunctioning computing devices. Even if a computing device is not adversely affected by the SU, the warning notification itself may generate negative publicity and an unsatisfactory customer experience. The provider often ends up replacing (the now malfunctioning) computing devices or is at least under pressure to cure the problem as soon as possible. Further, the provider may suffer from a tarnished brand image.

Hence, a need exists to provide a controlled SU over the air that is capable of silently removing a potentially problematic SU from targeted computing devices.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
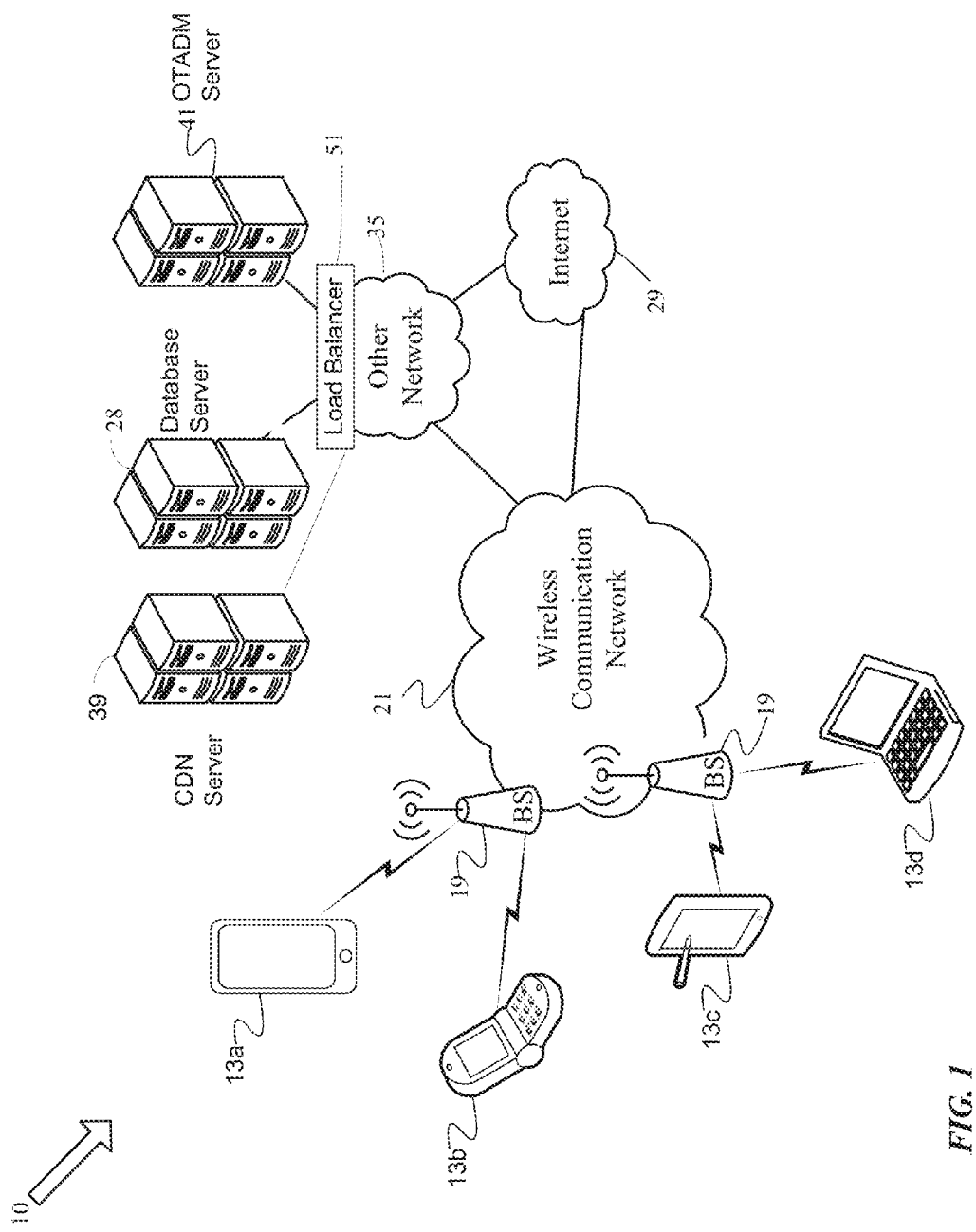
FIG. 1 illustrates a wireless packet data communication network for providing mobile communications for computing devices, which includes a framework for providing software updates and SU cancellation thereof to a computing device.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring unique aspects of the present teachings.

The various examples discussed below relate to controlled OTA SUs for computing devices. During a SU campaign, a server sends a notification of the availability of the SU to a predetermined group of computing devices over a wireless communication network. This first group may comprise a particular make (e.g., manufacturer) and model of a computing device. The SU may be downloaded to the computing device without user notification; however, it may not be installed on the computing device until there is a user acknowledgment. Alternatively, the SU may be downloaded after receiving the user authorization to download the SU to the computing device and installed immediately or upon receiving further authorization from the user for installing the SU on the computing device.

If the carrier or provider later determines that there is a (potential) problem with the SU after a campaign has been initiated or even completed, the server may send a silent cancellation message to a group of computing devices that have received the SU and may ultimately have a problem with it. In one implementation, the silent cancellation message corresponds to a cancellation message that is transparent to the user of the computing device. To cancel the update process, no pop-ups, notifications, schedule entries, or input or acknowledgment of said notification are provided to the user of the computing device associated with the cancellation of the SU.

In one example, the computing device sends a response to the server to indicate whether installation of the SU was successfully prevented or whether it was too late (e.g., the SU was already installed). In one example, if the server does not receive a response from the computing device, the server attempts to cancel the update process by retrying, and repeats sending the silent cancellation message to the computing devices that have not responded. The sending of the silent cancellation message may be repeated at until a response is received from each computing device. In various implementations, the interval between consecutive repeat transmissions of the silent cancellation message may vary based on the type of SU, severity of the issue, type of device, account preferences set by the user, and the like. The response may be stored in a database accessible to the server and may indicate whether the SU was successfully canceled or whether it was installed on the computing device. The database may include other information such as information regarding a predetermined group associated with the computing device. For example, the information in the database may include the device model, the device make (e.g., manufacturer), whether the computing device associated with a subscriber has successfully installed the SU, whether the SU cancellation was successful, whether the computing device has responded to the prior SU cancellation request, and the like. The information in the database is used to create and continually update the group of computing devices to which the SU cancellation message is sent.

To this end, the silent cancellation message discussed herein may prevent the installation of the SU on computing devices that downloaded the SU, or were in the process of downloading the SU. This may reduce the number of computing devices that may be negatively impacted by the potentially problematic SU. Specifically, the number of computing devices that are replaced or subsequently updated with corrected SUs, may be reduced compared to those computing devices that installed the SU and are experiencing problems with the SU. Thus, computing devices may be cured through the silent cancellation message sent from the server to the computing devices. Typically, the percentage of devices that later need to be replaced or updated is a relatively small percentage (e.g., 1%) of total devices, which received and even installed the SU. Accordingly, the silent nature of the SU cancellation message may prevent negative impact to the customer (as well as negative association with the SU for the customer), prevent negative impact on the wireless communication network 21, and provide additional time to address the potential SU update issues.

Reference now is made in detail to the examples illustrated in the accompanying drawings and discussed below. FIG. 1 illustrates a number of computing devices, a wireless communication network coupled to other communication networks, and several systems/elements associated with or included in the mobile network for various functions that may be involved in providing a controlled SU, where the SU can be silently cancelled. FIG. 1 illustrates a wireless communication network 21 as may be operated by a carrier or service provider to provide a wide range of mobile communication services and ancillary services or features to its subscribed customers and associated computing device users. The elements indicated by the reference numeral 10 generally are elements of the system and are operated by (or on behalf of) the carrier, although the computing devices may be sold to the carrier's customers. The wireless communication network 21 provides communications between computing devices (e.g., 13a to 13d) as well as communications for the computing devices with networks and stations outside the mobile communication system. While FIG. 1 illustrates a wireless communication network 21 by way of example, it will be understood that a wired communication between the computing devices 13a to 13d and the network 35 is supported as well based on the concepts herein.

For purposes of later discussion, several computing devices (e.g., 13a to 13d) appear in the drawing, to represent examples of the computing devices that may receive various services via the wireless communication network 21. Today, computing devices may be mobile and may take the form of portable handsets, smart-phones, tablet computers, laptop or other portable personal computers (PCs), or personal digital assistants (PDAs). Of course, they may be implemented in other form factors, including various types of consumer and business electronic devices. The computing devices 13a, 13b, 13c, and 13d, for example, may take the form of a mobile telephone station 13b, enhanced with display and user input capabilities to support text and image communications, such as email, picture communication and web browsing applications. Still further, enhanced mobile stations are now referred to as smart-phones, such as the touch screen smart-phone shown at 13a or a tablets, as shown in 13c in FIG. 1. Each computing device 13a, 13b, 13c, and 13d may include a wireless transceiver compatible with the particular type of packet data service offered by the system 10.

The system 10 allows users of the computing devices to initiate and receive telephone calls to each other as well as Short Message Service (SMS); a type of text messaging between mobile devices and similar messaging with other devices via the Internet. The system 10 typically offers a variety of other data services via the Internet 29, such as downloads, web browsing, e-mail, etc.

The wireless communication network 21 typically is implemented by a number of interconnected networks. Hence, the overall system 10 may include a number of Radio Access Networks (RANs), as well as regional ground networks interconnecting a number of RANs and a wide area network (WAN) interconnecting the regional ground networks to core network elements, such as the Multimedia Messaging Service Centers (MMSCs), not shown. A regional portion of the system 10, such as that serving mobile devices 13a to 13d typically includes one or more RANs and a regional circuit and/or packet switched network and associated signaling network facilities. However, these elements may be configured and/or interconnected in a variety of different ways, e.g. depending on the generation (2G, 3G, or 4G) of the mobile network technology.

Physical elements of a RAN, operated by one of the mobile service providers or carriers, include a number of base stations represented in the example by the Base Stations (BSs) 19. Such Base Stations 19 typically include a Base Transceiver System (BTS) which communicates via an antennae system at the site of base station and over the airlink with one or more of the computing devices 13a to 13d when the mobile devices are within range. Each BS 19 typically includes a BTS coupled to several antennae mounted on a radio tower within a coverage area often referred to as a "cell." The BTS is the part of the radio network that sends and receives Radio signals to/from the mobile devices that the base station currently serves.

The radio access networks also include a traffic network represented generally by the cloud at 21, which carries the communication signals for the mobile devices 13a to 13d between the respective Base Stations 19 and other elements with or through which the mobile devices 13a to 13d communicate, including the Over The Air Device Management (OTADM) server 41. Individual elements such as switches and/or routers forming the traffic network 21 are omitted here for simplicity.

The traffic network portion 21 of the wireless communication network 21 connects to a public packet switched data communication network, such as the network commonly referred to as the "Internet" shown at 29. Packet switched communications via the traffic network 21 and the Internet 29 may support a variety of user-services through the system 10, such as mobile device communications of text and multimedia messages, e-mail, web surfing or browsing, programming and media downloading (including audio and video), etc.

The carrier also operates a number of systems that provide ancillary functions in support of the communications services provided through the system 10, and those elements communicate with other nodes/elements of the system 10 via one or more private IP type packet data networks 35 (sometimes referred to as an Intranet). These support elements, for example, include an Over The Air Data Management (OTADM) server 41, Database server 28, and a Content Delivery Network server 39.

The OTADM server 41 monitors, manages and supports computing devices OTA via the wireless communication network 21. The OTADM server 41 may provide OTA notification of applications, data, firmware, and configuration settings for different makes and models of computing devices. The OTADM server 41 may determine whether an SU is available for targeted computing devices 13a-13d and may distribute the SU over the air to the targeted computing devices. The OTADM server 41 may determine whether the SU is available for the targeted computing devices based on the make (e.g., manufacturer) and/or model of the computing devices. The OTADM server 41 may be configured to remotely monitor for successful installation of the SU in any of the targeted computing devices. Upon determining that the SU is subject to a problem or potential problem, the OTADM server 41 may identify which of the targeted computing devices have not yet completed receiving and installing the SU. The OTADM server 41 may send a cancel SU message through the wireless communication network 21 to the identified targeted computing devices, instructing the identified target communicating devices to cancel the SU. In various implementations, the cancel SU message may be sent in a batch to the targeted computing devices or in quick succession (e.g., within a second) to one targeted computing device after another.

The database server 28 may provide subscriber information related to each computing device. The subscriber information may include the subscription profile, the device model, the device make, etc. The subscriber information may also include information regarding whether the computing device associated with the subscriber has successfully installed the SU, whether the SU cancellation was successful, whether the computing device has responded to the prior SU cancellation request. The OTADM server 41 may provide the database server 28 with the information regarding successful installation of the SU, successful cancellation of the SU, and response to prior SU cancellation requests. The way the OTADM server 41 determines the information regarding the SU status of the computing device is discussed in more detail below.

The Content Delivery Network or Content Distribution Network (CDN) server 39 is a distributed system of servers that may be deployed in multiple data centers. The CDN server 39 provides software and data content to computing devices 13a to 13d OTA via the wireless communication network 21. For example, CDN server 39 may include prior and present copies of firmware packages for respective computing devices. Put differently, CDN server 39 may be a repository for content that a mobile device (e.g., 13a) refers to for SU updates. In one example, if software that is stored in the CDN server 39 is determined to be problematic by the OTADM server 41, the software is removed therefrom. As discussed in more detail below, the functions of the CDN server 39 may be combined in the OTADM server 41.

Each of the servers 39, 28, and 41 may be implemented in a distributed fashion on a number of similar platforms, to distribute the processing load and/or to provide effective notification of software updates and cancellation thereof. In this regard, for a large number of computing devices (e.g., that may be distributed geographically) there may be a load balancer 51 to distribute the load of the SU and the cancellation thereof. Each of the CDN 39, database 28, and OTADM servers 41 can be stand-alone or combined on a single server. Thus, the functionality described herein with respect to each of the servers 39, 28, and 41 can also be provided by one or multiple different servers.

In one implementation, a computing device (e.g., 13a) includes a client application configured to control the download, installation, and possible cancellation of an SU.

Figure 2C:
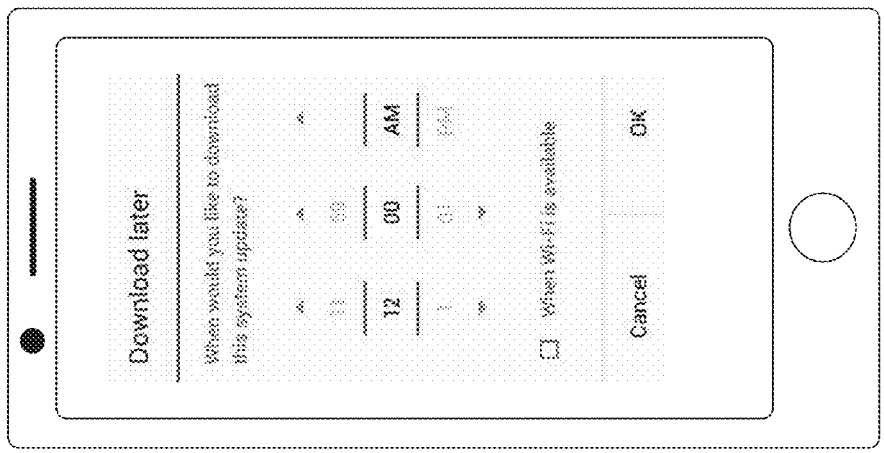
FIG. 2c illustrates an exemplary software update deferred download notification displayed on one of the computing devices shown in FIG. 1.
Figure 2B:
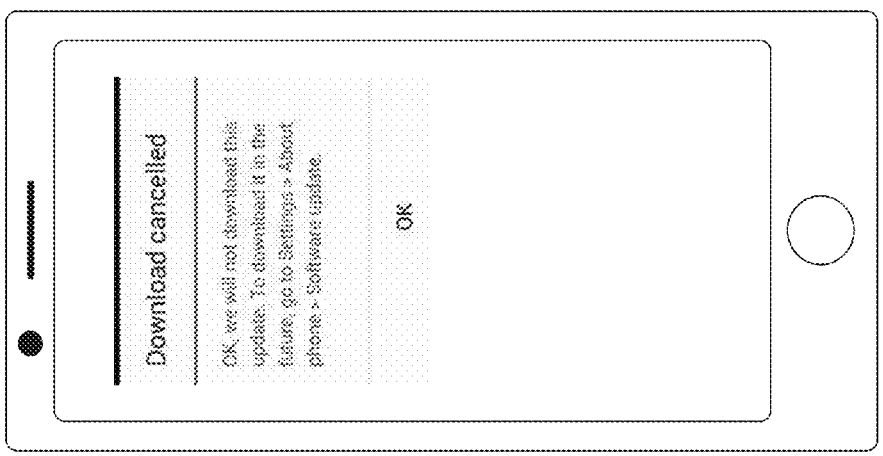
FIG. 2b illustrates an exemplary software update rejection notification displayed on one of the computing devices shown in FIG. 1, indicating the end-user may decide not to accept the software update or download.
Figure 2A:
FIG. 2a illustrates an exemplary software update availability notification displayed on one of the computing devices shown in FIG. 1.

FIG. 2a illustrates an exemplary SU availability notification displayed on one of the computing devices shown in FIG. 1. It provides a SU availability notification that includes a prompt for the download thereof. Upon receiving a notification regarding the availability of OTA SU from the OTADM server 41, the computing device 13a displays the availability of the SU to the user on a display of the computing device 13a. The user may select to download the SU immediately, at a later time, or decline the update altogether. The display may indicate the space required for the SU, whether sufficient space is available, and the estimated download time. If the user chooses to download the SU immediately, the SU is downloaded OTA and stored in a memory of the computing device 13a, which is discussed in more detail later. If the user defers the SU, the display may provide the user with various options relating to the deferral of the SU, as illustrated in FIG. 2b. The various options may include time, date, or the availability of a wireless connection (e.g., via the wireless communication network 21 or Wi-Fi) necessary for downloading the SU, as illustrated in FIG. 2c.

In one implementation, the download of the SU is performed without user notification or involvement. For example, when an SU is available, the OTADM server 41 sends the link for the update (e.g., CDN server 39) to the computing device 13a OTA via the wireless communication network 21. The device 13a may then download the SU from the CDN server 39 over the wireless communication network 21. Thus, the download of the SU may be transparent to the user.

Figure 2F:
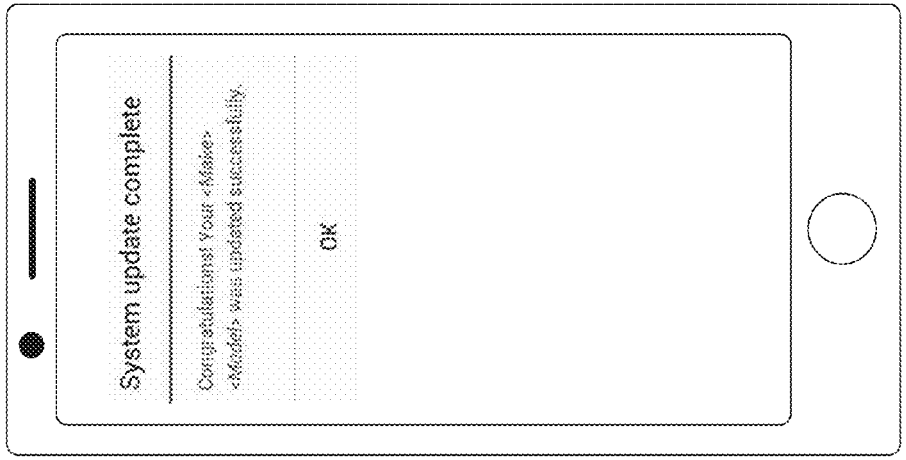
FIG. 2f illustrates an exemplary notification of successful installation of a software upgrade that is displayed on one of the computing devices shown in FIG. 1.
Figure 2E:
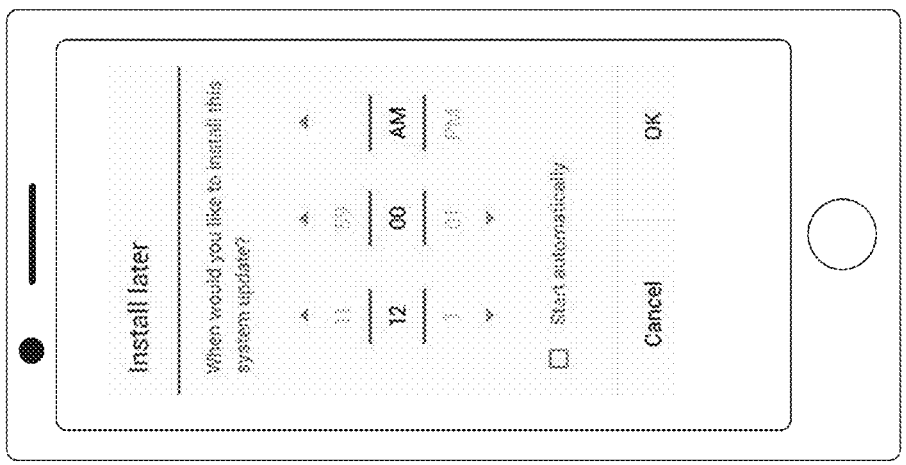
FIG. 2e illustrates an exemplary option for deferred installation of a software update that is displayed on one of the computing devices shown in FIG. 1.
Figure 2D:
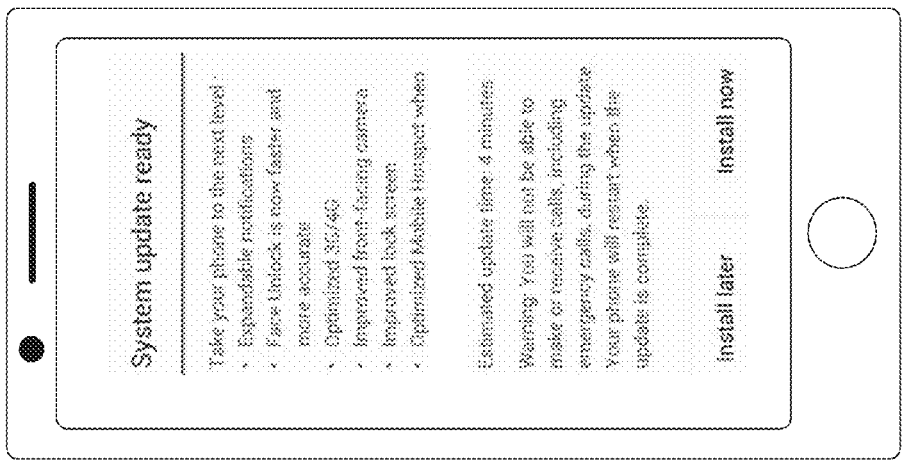
FIG. 2d illustrates an exemplary software update installation notification displayed on one of the computing devices shown in FIG. 1.

Regardless whether the download of the SU is performed with user confirmation or in the background, the installation of the SU typically requires a user acknowledgment. In this regard, FIG. 2d illustrates an exemplary SU installation availability notification displayed on one of the computing devices shown in FIG. 1. The notification on the user interface of a computing device indicates that the SU is ready to be installed. The notification may include details of the SU, such as the features, estimated update time, and a warning that the device will not be available during the update. The user can choose to install the SU immediately or at later time. If the user defers the installation, the display may provide various options, such as time and/or date of the installation, or whether to perform the installation automatically (e.g., as soon as the computing device 13a is not in active use and/or connected to a charger), as illustrated in FIG. 2e. In one implementation, until the installation is completed, the client on the computing device 13a is able to terminate the SU installation upon receiving an SU cancellation message from the OTADM server 41. The SU cancellation message may be received via SMS, for example. In another implementation, once the installation of the SU commences, it may not be cancelled.

If no SU cancellation message is received by the client, the SU is installed in the computing device 13a, based on the user installation selection (e.g., immediately or deferred). A notification may appear on the user interface of the computing device 13a that indicates that the SU was successful, as illustrated in FIG. 2f. In one example, the client triggers a confirmation message to the OTADM server 41, to indicate that the SU installation has been successfully completed.

The client that runs on the computing device 13a is also configured to control the display of messages in connection with the SU and remove the display of such messages upon receiving an SU cancellation message from the OTADM server 41. For example, if the computing device 13a receives an SU cancellation message (e.g., in SMS) (i) prior to, or (ii) during the download of the SU, no messages are displayed on the user interface. In one embodiment, any ongoing download and/or displayed message is immediately severed/removed upon receiving an SU cancellation message from the OTADM server 41. Further, any automatic device inquiries from the computing device 13a to download the SU (e.g., from CDN server 39) are prevented. The start time for preventing the automatic device inquiries may occur as soon as the OTADM server 41 determines that a predetermined number of SUs have resulted in a failure. In this regard, a cancellation message is immediately sent to all devices that have not yet upgraded. For example, such message may be sent every 4 hours until the OTADM server 41 receives a confirmation (e.g., whether the SU installation or cancellation thereof was successful) from targeted devices. Typical time frames for receiving a confirmation from targeted devices are two or three days after the start of the SU cancel campaign.

Thus, if the computing device 13a receives the SU cancellation prior to the initiation of the SU download or during the SU download, no notification is provided on the user interface of the computing device 13a. In one example, the SU is removed from the repository (e.g., CDN server 39) after the SU cancellation message is sent.

In one implementation, if a download of the SU has already begun, (e.g., FIGS. 2a to 2c, or a download progress bar is displayed), when an SU cancellation message is received by the computing device 13a, the computing device 13a continues the download until completion. However, no additional download or update messages in connection with this SU are displayed on the computing device 13a. The download may be purged from the computing device 13a by a subsequent message from the OTADM server 41.

If the computing device 13a receives the SU cancellation message after the download of the SU has completed in the background—but before any SU notification is displayed on the computing device 13a—the client (e.g., software application) prevents the display of such notifications (e.g., FIGS. 2d and 2e). In one example, if the computing device 13a receives the SU cancellation message (i) prior to the notification of the SU installation availability, (ii) during the notification, (iii) after the user rejects the installation, or (iv) after the user defers the installation, no additional notifications in connection with the SU update are provided on the user interface of the computing device 13a. Thus, if the user chooses to defer the installation (e.g., FIG. 2e) to a specific time and/or date, and an SU cancellation message is received from the OTADM server 41 before the specific time and/or date, the installation is prevented and no further updates (e.g., see FIGS. 2e and 2o are provided on the user interface of the computing device 13a.

As described above, the OTADM server 41 may cancel an SU in a way that is transparent to the user of the computing device (e.g., 13a). Such cancellation may occur at any point prior to the completion of the installation, such as prior to the download or during the download, regardless of what messages are already displayed on the user interface of the computing device 13a in connection with the SU. The cancellation message from the OTADM server 41 to the computing device 13a in one embodiment is via a short messaging system (SMS) over the wireless communication network 21.

As is known, the Open Mobile Alliance (OMA) includes standards for the mobile communication industry. For example, the protocol specifies exchange of packages during a session, each package consisting of several messages. Each message in turn comprises one or more commands. The OTADM server 41 initiates the commands and the client on the computing device 13a executes the commands and returns the result via a reply message. For example, a vendor-specified field in the data message from the OTADM server 41 may be populated with a "code" to indicate the SMS is for an SU cancellation (e.g., 1010101010101). When the SMS message is received by the computing device 13a, and the client determines that the message includes an SU cancellation code, the computing device 13a is controlled to perform the cancellation of the SU, as discussed herein.

Computing devices (e.g., 13a to 13d) typically queue SMS messages in the order in which they have arrived. However, in one aspect, an SU cancellation SMS message has priority over any other message received, including from the OTADM server 41. In one example, the SU cancellation SMS message to the computing device 13a uses a signaling channel and/or out-of-band signaling resources of the wireless communication network 21 for transport to/from a server platform referred to as a SMSC (Short Message Service Center), not shown. The SMSC, for example, receives packet communications containing text messages and forwards the messages via the signaling resources and the signaling channels to the appropriate computing device. The SMSC may also receive similar messages from the computing devices and forward them to servers accessible via an Internet Protocol (IP) packet data network, such as wireless communication network 21. In one aspect, the SMSC is configured to identify the SU cancellation message (e.g., from the vendor-specified field discussed above). The SMSC sets the priority via the SMPP protocol. The higher priority messages are placed at the beginning of the queue.

In one example, the client on the computing device (e.g., 13a) prioritizes the SU cancellation SMS message over other SMS messages. This prioritization may be performed independent of the prioritization from the SMSC discussed above. For example, computing device 13a may be OFF or simply beyond wireless reach (e.g., going through a tunnel where there is no network access). When the computing device 13a becomes available, it may receive several backlogged SMS messages. In this example, the client on the computing device 13a, upon recognizing that one of the SMS messages is an SU cancellation SMS message, prioritizes this message over any other SMS message. Thus, even if multiple SMS messages are received from various sources, the client configures the computing device to cancel the SU update prior to processing other SMS messages.

In one example, the client on the computing device (e.g., 13a) provides an installation status response to the OTADM server 41. For example, if the computing device 13a receives an SU cancellation message from the OTADM server 41 prior to the installation of the SU and the installation is successfully aborted, the client triggers a confirmation message (e.g., via IP connections) to the OTADM server 41 (e.g., SU Cancel Error Code 554), thereby indicating that the SU cancellation was successful. The OTADM server 41 (or a database associated therewith) may record this SU status for the particular device. In one example, any SU that was downloaded, irrespective of whether user initiated or in the "background," is purged from the computing device 13a and no subsequent messages in connection with the SU are provided on the user interface of the computing device 13a.

However, if the SU cancellation message from the OTADM server 41 is received too late by the computing device 13a (e.g., the SU is already installed or is in the process of installing), the client triggers a fail message (e.g., via an IP connection) to the OTADM server 41 (e.g., SU Cancel Error Code 552). In various embodiments, the OTADM server 41 or a database associated therewith—such as database server 28—may record that the computing device 13a has installed the SU and that the SU cancellation request was not successful. In this regard, the computing device 13a continues to use the new software. In one example, the cancellation request remains transparent from the user of the computing device. As discussed above, even if the SU may not be completely compatible on some computing devices that have particular configurations, it is likely that the software will function properly on at least some of the different computing devices that may have installed the SU.

If the user had opted to defer the download and/or the installation of SU and an SU cancellation message is received from the OTADM server 41 in the interim (prior to installation), the client may trigger cancellation of the deferred download of the SU. The client may trigger a response message, such as an SU Cancel Error code, to the OTADM server 41 (e.g., SU Cancel Error Code 553), thereby indicating that the SU was prevented in time.

If the computing device 13a receives an SU cancellation during the installation of the SU, the installation is continued and the client treats the response to the OTADM server 41 similar to an SU cancellation message that came too late.

Figure 3:
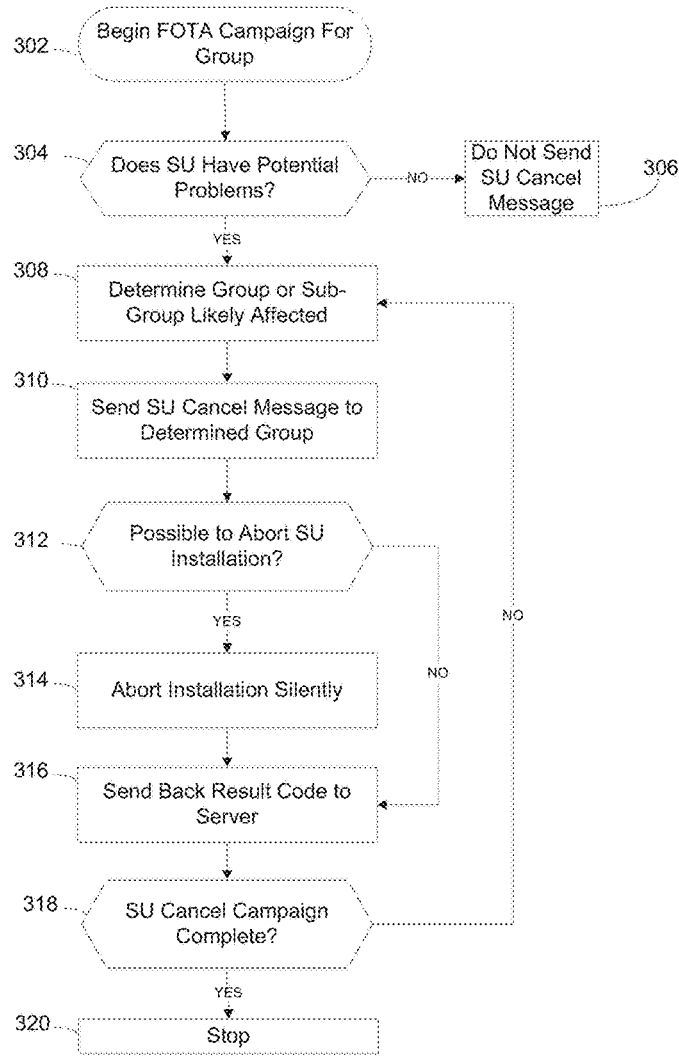
FIG. 3 illustrates an exemplary high level flow-chart of a controlled over the air software update for one or more computing devices shown in FIG. 1.

With the foregoing overview of the system, it may be helpful now to consider a high-level discussion of an SU cancellation message from an OTADM server 41 over a wireless communication network 21. FIG. 3 illustrates an exemplary high level flow-chart where a software upgrade is silently canceled for one or more computing devices shown in FIG. 1.

In step 302, the SU process begins. For example, the SU may relate to a firmware over the air (FOTA) campaign to update the firmware for a particular make and model (e.g., first group) of computing devices (e.g., 13a). The SU may be provided to these targeted devices by the OTADM server 41 (i) upon user approval or (ii) in the background of the computing device 13a. In one example, the OTADM server 41 provides a link to the CDN server 39, from which the computing device can download the SU.

In step 304, the provider or carrier determines that the SU may have a problem. In various examples, tests subsequent to the initial release of the SU may indicate one or more of the following: (i) in one or more configurations, a computing device in the group may not function properly; (ii) the number of computing devices in the group that have received the SU and now need repair or replacement may exceed a threshold; (iii) the number of customer care calls may be unusually high after the initiation of the SU campaign; (iv) user forums complain about bugs with the SU; and the like. Under normal circumstances, where the SU cancellation termination criteria is not met, the campaign continues unabated (i.e., step 306). However, if one or more of the above criteria is met, the method continues with step 308 below.

In step 308, based on the identified potential problem with the SU, a second group of computing devices is created by the OTADM server 41 that will likely be affected by the SU (e.g., meets predetermined criteria). The second group of devices may be the same as the first group or a smaller group within the first group that has a particular configuration that will likely be affected by the SU. In one example, the OTADM server 41 identifies particular computing devices (e.g., 13a) by their mobile device numbers (MDN) that the OTADM server 41 has stored in its database (e.g., database server 28). In one example, computing devices that have already successfully completed the installation of the SU are not included in the second group. As discussed above, the OTADM server 41 receives a confirmation upon successful installation from the computing device, which enables the OTADM server 41 to focus on the computing devices that have still not completed the installation of the SU.

In step 310, an SU cancellation message is sent to the second group. In step 312 each computing device that receives the SU cancellation message determines whether it is possible to abort the SU. For example, if the computing device 13a receives an SU cancellation message (e.g., in SMS) after the installation is complete, the method continues with step 316, where a notification is sent to the OTADM server 41 indicating that the SU has already been successfully installed (i.e., it is too late for the SU cancellation). The OTADM server 41 records the status of the respective computing device 13a (e.g., SU was not removed because it was too late). In one example, if the SU cancellation message is received during installation, the installation is allowed to complete and is treated as too late to abort. No messages are displayed in connection with the SU cancellation request on the user interface of the computing device 13a, thereby keeping the SU cancellation message silent from the user.

However, if the computing device 13a receives an SU cancellation message (e.g., in SMS) (i) after indicating to the OTADM server 41 that downloading of the SU is desired but prior to the download of the SU, (ii) during the download of the SU, or (iii) after the download of the SU but prior to the installation of the SU, no messages are displayed on the user interface. Further, any existing (or active) download and display message on the computing device is immediately removed upon receiving the SU cancellation message from the OTADM server 41. Thus, if the computing device 13a receives the SU cancellation prior to the initiation of the SU download or during the SU download, no notification is provided on the user interface of the computing device 13a and the download of the SU is prevented or removed silently (e.g., without user awareness) (i.e., step 314). In step 316, the OTADM server 41 is then notified by the computing device that the SU was successfully removed, which is recorded by the OTADM server 41 (or a server associated therewith, such as database server 28).

In one implementation, the OTADM server 41 continues the SU cancellation campaign until it receives a confirmation (e.g., whether the SU was successfully installed or prevented) from each computing device from the first group. For example, the OTADM server 41 sends the SU cancellation message to a second group (i.e., a subgroup of the first group of targeted computing devices) from which it has not received a confirmation. To that end, in step 318, the OTADM server 41 sends an SU cancellation message to the subgroup of computing devices that have not provided a confirmation message. This SU cancellation message may be sent at a predetermined time interval. This iterative process may continue until the campaign ends (i.e., step 320). In various examples, at least some of the steps according to FIG. 3 can be implemented at the client (e.g., application program) level or operating system (OS) level.

Figure 4A:
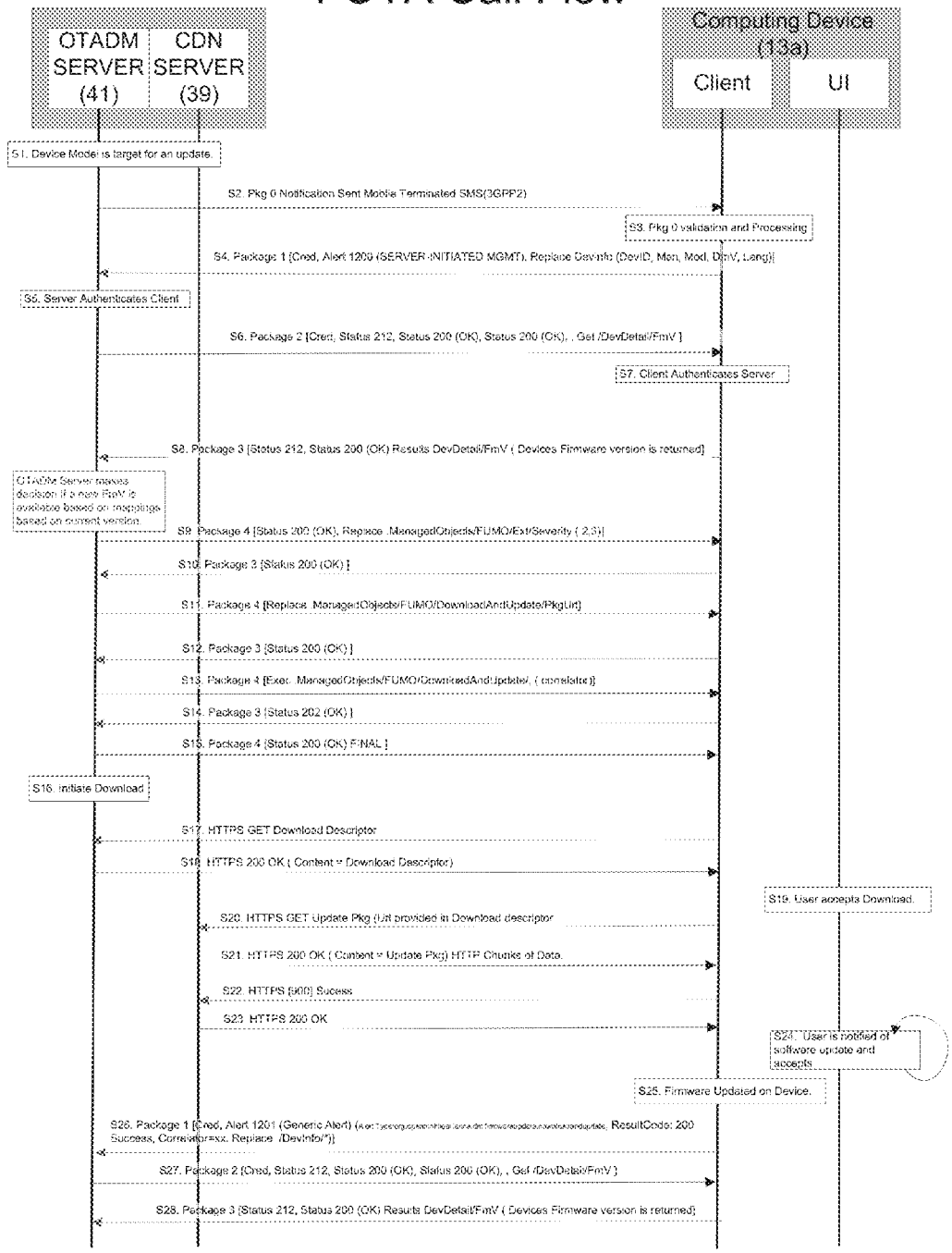
FIG. 4a illustrates an exemplary call flow for a firmware over the air software update for a computing device shown in FIG. 1.

Perhaps it may be helpful now to consider high-level discussions of call flows that provide a controlled SU over a wireless communication network 21. FIG. 4a illustrates an exemplary call flow between a computing device and an OTADM server 41 without an SU cancellation message. In step S1 of FIG. 4a, the OTADM server 41 determines that an SU is available for a group of computing devices (13a), (e.g., based on make (e.g., manufacturer) and model of the computing device). In step S2, a notification is sent to the one or more computing devices that are in this group (13a in this example), e.g. through a Wireless Application Protocol (WAP)-encoded SMS message. While in various embodiments this notification may be in the background or with display to the user of the computing device, it will be assumed in this example that the SU availability notification is a silent notification. In one example, the group in steps 1 and 2 may be a subgroup (e.g., one or more computing devices of a make (e.g., manufacturer) and model that have not yet responded to an SU message). Put differently, computing devices that are known to have already successfully installed the SU or where the user has rejected the SU are not included in the group of steps 1 and 2.

In step S3, the client (e.g., application program or operating system) of the computing device 13a receives the SU availability notification from the OTADM server 41. For example, the client wakes up and learns that there is an SU available. This step is silent in that it is transparent from the user of the computing device 13a.

In step S4, the client of the computing device 13a responds with a data package to the OTADM server 41 with relevant information. The response may include the device identification (ID), the manufacturer, model number, etc., of the computing device 13a. The device ID may be the serial number of the computing device 13a, such as the International Mobile Station Equipment Identity (IMEI) number which is a number that is unique for a mobile device. An IMEI number is frequently found printed inside the battery compartment of a 4G mobile phone. In another example, for 3G mobile devices, the mobile equipment identifier (MEID) can be used as the device ID.

In step S5, the OTADM server 41 authenticates the computing device 13a based on the information provided in the data package from the client. Accordingly, the OTADM server 41 confirms that it is communicating with the correct computing device 13a.

In step S6, the OTADM server 41 requests the firmware version from the computing device 13a. For example, the user of the computing device 13a may have already updated their device software or replaced it with an alternate or hacked version. Such devices may be treated differently, as described below.

In step S7, the client on the computing device 13a authenticates the OTADM server 41 for security purposes. For example, the computing device 13a determines whether the OTADM server 41 is authorized to provide OTA SUs.

In step S8, the client of the computing device 13a responds to the OTADM server 41 by acknowledging successful authentication of the OTADM server 41 and providing the firmware version. It should be noted that if the firmware presently installed is either already updated, a hacked version, or not compatible with the authorized version, the OTADM server 41 may not make the SU available to the computing device 13a.

In step S9, the OTADM server 41 responds to the client of the computing device 13a with a data package that includes the severity of the SU update. For example, some updates are more critical than others. For less critical SU updates (e.g., not related to security), a lesser priority may be attributed, such as "optional." More critical updates may require a sooner (e.g., immediate) silent download. The severity determines how interactive the SU may be with the user, as provided in the context of the discussion of FIGS. 2a to 2c above. It should be noted that the data package is not sent in this step. Rather, the client of the computing device 13a is prepared for the SU download, which (in this example) is provided by CDN server 39.

In step S10, the computing device 13a acknowledges the receipt of the message from the OTADM server 41. Thus, the client of the computing device 13a is aware of the severity of the SU update.

In step S11, the OTADM server 41 sends the location (e.g., URL) of where to find the SU package, to the computing device 13a. In this example, it is assumed that the SU package is available from the CDN server 39. As discussed before, the functions of the CDN server may be inherent in the OTADM server 41 in other examples.

In step S12, the computing device 13a confirms to the OTADM server 41 that it has received the last data message and, thus, knows the location of the SU.

In step S13, the OTADM server 41 sends instructions to download the SU package to the computing device 13a and install it.

In step S14, the computing device 13a acknowledges receipt of the download instruction to the OTADM server 41.

In step S15, the OTADM server 41 sends an acknowledgment to the computing device 13a, thereby completing the preparation stage of the SU.

In step S16, the OTADM server 41 initiates the download of the SU by sending a download descriptor (DD) file. The download descriptor file may contain information about the upcoming SU, such as the size or time required for the SU. The DD file may also include text to display to the user.

In step S17, the client of the computing device 13a requests the DD file from the OTADM server 41, and receives it therefrom (i.e., in step S18).

As discussed before, the download may be performed in the background or with user interaction. For example, in step S19, the computing device 13a may display the availability of the upgrade to the user on interface (UI) of the computing device 13a. The user may select to download the SU immediately, later, or decline the update altogether. The display may indicate the space required, whether sufficient space is available, and the estimated download time. If the user chooses to download immediately, the SU is downloaded OTA and stored in a memory of the computing device 13. If the user declines the update, the display may indicate how to perform the upgrade in the future. If the user defers the update, the display may provide various criteria, such as time, date, or the availability of a wireless connection (e.g., via the wireless communication network 21 or Wi-Fi). Whether the download is in the background or interactive via user acknowledgment the download uses the information in the DD file.

In step S20, (e.g., upon user authorization or in the background) the client of the computing device 13a contacts the CDN server 39 to request the SU data package, as instructed by the download and update instructions in S13.

In step S21, the CDN server 39 provides the SU to the computing device 13a, which is received by the client and stored in a memory of the computing device 13a.

In step S22, the client of the computing device 13a acknowledges successful download of the SU package by sending a response to the CDN server 39.

In step S23, the CDN server 39 confirms the acknowledgment by sending its own acknowledgment to the computing device 13a.

As discussed before, the user of the computing device 13a may be notified on the user interface of a computing device that an SU is ready to be installed. The notification may include details of the SU, such as the features, estimated update time, and a warning that the device will not be available during the update. The user can choose to install the SU immediately, later, or reject the installation altogether. If the user defers the installation, the display may provide various options, such as the time and/or date of the installation, or whether it should be installed automatically (e.g., as soon as device is not in active use and/or connected to a charger) for the installation.

It should be noted that until step S24, (e.g., until the commencement of the SU installation), the client on the computing device 13a is still capable of terminating the SU installation, upon receiving an SU cancellation message from the OTADM server 41. However, if no SU cancellation message is received, the SU is installed in the computing device 13a, based on the user selection in step S25. A notification may appear on the user interface of the computing device 13a indicating that the SU was successful.

In step S26, the client triggers a confirmation message to the OTADM server 41, thereby indicating that the SU installation has been successfully completed.

In step S27, the OTADM server 41 records the status of the computing device 13a (e.g., SU installed successfully) and sends an acknowledgment to the computing device 13a. In one example, the OTADM server 41 includes a request for the SU update version (e.g., firmware in this example) in its message to the computing device 13a.

In step S28, the client of the computing device 13a returns the SU version to the OTADM server 41, which is stored in a memory of the OTADM server 41 (or a memory associated therewith, such as database server 28 of FIG. 1).

Figure 4B:
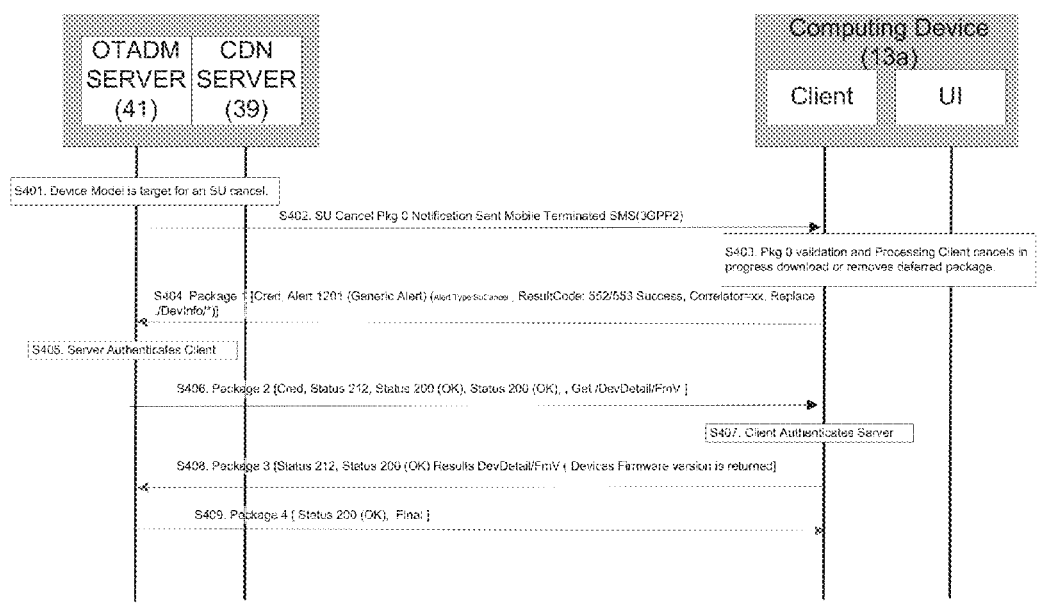
FIG. 4b illustrates an exemplary call flow for a firmware over the air software update that is silently cancelled for a computing device shown in FIG. 1.

Reference now is made to FIG. 4b, which illustrates an exemplary call flow between a computing device 13a and an OTADM server 41 that includes an SU cancellation message before the installation of the SU. In the steps that follow, it is assumed that an SU has not yet been successfully installed. Put differently, the steps of FIG. 4b described below occur at any point before step S25 of FIG. 4a discussed above.

In step S401 of FIG. 4b, the provider or carrier determines that the SU should be canceled and configures the OTADM server 41 to cancel a predetermined group of computing devices (13a), (e.g., based on make and model of the computing device). This second group comprises computing devices that are not known by the OTADM server 41 to have already installed the SU, which may include computing devices that have not responded to a prior SU cancellation message (e.g., subgroup of an original SU cancellation group). Put differently, the second group of computing devices may include devices that are likely to be affected and devices that have indicated that they want to download and/or have downloaded the SU.

In step S402, an SU cancellation message is sent by the OTADM server 41 to the one or more computing devices that are in this second group (13a in this example). This cancellation message is "silent" to the user in that no messages indicating SU operation(s) are displayed on the UI of the computing device 13a.

In step S403, the client (e.g., application program or operating system) of the computing device 13a, upon receiving the SU cancellation message from the OTADM server 41, determines whether it is possible to abort the SU. For example, if the client of the computing device 13a receives an SU cancellation message after the installation is complete, it is too late to cancel the SU. In one example, if the SU cancellation message is received during installation, the installation is allowed to complete and is treated as too late for abort. However, if it is not too late, the SU package (if already downloaded) is deleted, while no messages are displayed in connection with the SU cancellation request on the user interface of the computing device 13a, thereby keeping the SU cancellation message silent from the user.

In step S404, the client on the computing device (e.g., 13a) provides an installation status response to the OTADM server 41 as well as other relevant information. For example, the response may include the device identification (ID), the manufacturer, model number, etc., of the computing device 13a.

If the computing device 13a receives an SU cancellation message from the OTADM server 41 prior to the installation of the SU and the installation is successfully aborted, the client triggers a confirmation message to the OTADM server 41 (e.g., SU Cancel Error Code 554), thereby indicating that the SU cancellation was successful. The OTADM server 41 (or a database associated therewith, such as database server 28) may record this SU status for the particular device. In one example, any SU that was downloaded, regardless whether user initiated or in the "background," is purged from the computing device 13a and no subsequent messages in connection with the SU are provided on the user interface of the computing device 13a.

However, if the SU cancellation message from the OTADM server 41 is received too late by the computing device 13a (e.g., the SU is already installed), the client triggers a failure message to the OTADM server 41 (e.g., SU Cancel Error Code 552). The OTADM server 41 (or a database associated therewith, such as database server 28) may record that the computing device 13*a* is using the SU and that the SU cancellation request was not successful. In this regard, the computing device 13*a* continues to use the updated software that was intended to be cancelled. In one example, the cancellation message remains silent from the user of the computing device. As discussed above, even if the SU may be not completely compatible on some computing devices that may have particular configurations, the software may still function properly on the present computing device 13*a*.

In one example, if the user had opted to defer the download and/or the installation of SU and an SU cancellation message is received from the OTADM server 41 in the interim, the client triggers a cancellation of the deferred download and/or update of the SU. The client may trigger a response message to the OTADM server 41 (e.g., SU Cancel Error Code 553), thereby indicating that the SU installation was prevented in time.

In step S405, the OTADM server 41 authenticates the computing device 13*a* based on the information provided in the data package from the computing device 13*a*. Accordingly, the OTADM server 41 confirms that it is communicating with the correct computing device 13*a*.

In step S406, the OTADM server 41 records the status of the computing device 13*a* (e.g., the SU cancelled successfully) and sends an acknowledgment to the computing device 13*a*. In one example, the OTADM server 41 includes a request for the SU update version (e.g., firmware in this example) in its message to the computing device 13*a*.

In step S407, the client on the computing device 13*a* authenticates the OTADM server 41 for security purposes. For example, the computing device 13*a* determines whether the OTADM server 41 is authorized to provide OTA SUs.

In step S408, the client of the computing device 13*a* responds to the OTADM server 41 by acknowledging successful authentication of the OTADM server 41 and providing the firmware version.

In step S409, the OTADM server 41 acknowledges receipt of the successful authentication notice from the client 13*a* by responding to the same.

Figure 5:
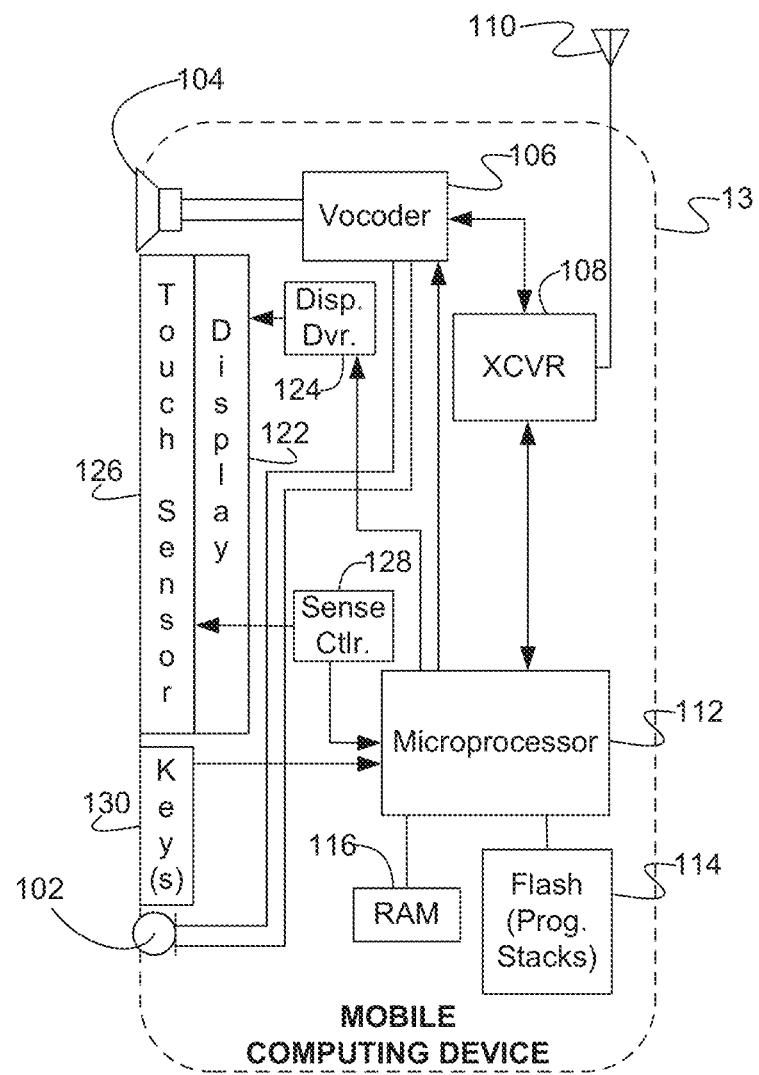
FIG. 5 illustrates a high level simplified function block diagram of an exemplary computing device.

As shown by the discussion of the FIGS. 1 to 4*b*, functions for receiving an SU, prioritizing messages, installing the SU, cancelling the SU, and receiving confirmations from a user discussed herein involves an appropriately configured computing device. It may be useful to consider the functional elements/aspects of an exemplary computing device, at a high-level. For purposes of such a discussion, FIG. 5 provides a block diagram illustration of an exemplary computing device 13. The computing device 13 may be a handset type mobile phone or may be incorporated into another device, such as a personal digital assistant (PDA), a tablet computer, a PERS wearable device, or the like. For discussion purposes, the illustration shows the computing device 13 in the form of a handheld smart-phone. The smart-phone example of the computing device 13 may function as a normal digital wireless telephone station. The computing device 13 includes a display 122 for displaying messages, location information, pseudo-hold messages, or the like, call related information dialed by the user, calling party numbers, etc. The computing device 13 also includes a touch/position sensor 126. The sensor 126 is relatively transparent, so that the user may view the information presented on the user output (i.e., display) 122. A sense controller 128 sensing signals from elements of the touch/position sensor 126 and detects occurrence and position of each touch of the screen formed by the display 122 and sensor 126. The sense circuit 128 provides touch position information to the microprocessor 112, which correlates that information to the information currently displayed via the display 122, to determine the nature of user input via the screen.

The display 122 and touch sensor 126 (and possibly one or more keys 130, if included) are the physical elements providing the textual and graphical user interface for the computing device 13. The microphone 102 and speaker 104 may be used as additional user interface elements, for audio input and output. Of course, other user interface elements may be used, such as a trackball, as in some types of smart phones or tablets.

In addition to normal telephone and data communication related input/output (including message input and message display functions), the user interface elements also may be used for display of notifications and other information to the user and user input of selections, for example, including selecting the time/date of the SU installation.

In the example of FIG. 5, a microprocessor 112 serves as a programmable controller or processor, in that it controls all operations of the computing device 13 in accord with programming that it executes, for all normal operations, and for operations involved in receiving SUs and cancellation thereof from one or more servers, such as CDN server 39 and OTADM server 39. In the example, the computing device 13 includes flash type program memory 114, for storage of various "software" or "firmware" program routines and mobile configuration settings, such as mobile telephone number (MTN or MDN), etc. The computing device 13 may also include a non-volatile random access memory (RAM) 116 for a working data processing memory. In a present implementation, the flash type program memory 114 stores firmware such as a boot routine, device driver software, an operating system, call processing software and vocoder control software, and any of a wide variety of other clients (e.g., applications), such as the application to control the download, installation, and possible cancellation of an SU discussed herein. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112. Accordingly, the computing device 13 includes a processor, and programming stored in the flash memory 114 configures the processor so that the computing device is capable of performing various desired functions, including receiving SUs and cancellation thereof that is silent from the user of the computing device 13.

As shown by the above discussion, functions for determining which group of computing devices (e.g., 13*a*) should receive an SU, making the SU available to a computing device, providing the relevant device model and make information, sending SU cancellation messages, and prioritizing SMS messages, include one or more servers such as CDN server 39, database server 28, and OTADM server 41, as shown in FIG. 1. Although special purpose devices may be used, such devices also may be implemented using one or more hardware platforms intended to represent a general class of data processing device commonly used to run "server" programming so as to implement the SU update functions and cancellation thereof discussed above, albeit with an appropriate network connection for data communication.

Figures 6, 7:
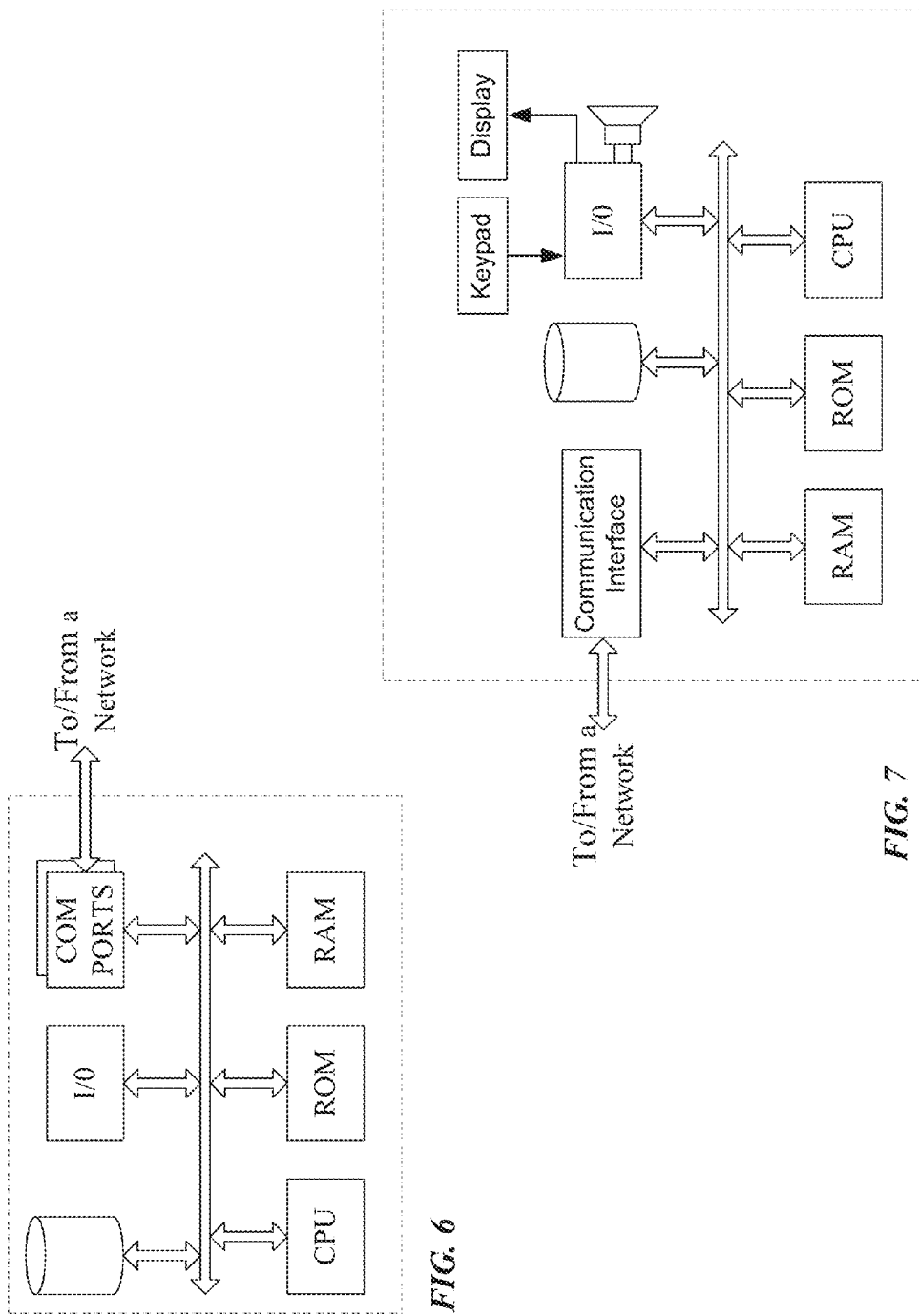
FIG. 6 illustrates a network or host computer.
FIG. 7 illustrates a computer with user interface elements.

FIGS. 6 and 7 provide functional block diagram illustrations of general purpose computer hardware platforms. FIG. 6 illustrates a network or host computer platform, as may typically be used to implement a server. FIG. 7 depicts a device with user interface elements, as may be used to implement a personal computer, such as computer 13*d* of FIG. 1 or a workstation, or to implement a computing device, such as a portable handset, a smart-phone, tablet computer, a personal digital assistant or other type of mobile station or mobile terminal device (e.g., devices 13*a* to 13*d* of FIG. 1), although the device of FIG. 7 may also act as a server if appropriately programmed. It is believed that the general structure and general operation of such equipment as shown in FIGS. 6 and 7 should be self-explanatory from the high-level illustrations.

A general purpose computer configured as a server, for example, includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load. In this case, such a platform would run server programming, for example, to provide SUs and SU cancellation messages to one or more computing devices (e.g., 13*a* to 13*d* in FIG. 1).

The software functionalities involve programming, including executable code as well as associated stored data, e.g., files used for applications on the computing device to receive SU notifications, download SU's, and receive cancellation messages of the SU. The software code is executable by the computing device. In operation, the code is stored within the computing device. At other times, however, the software may be stored at other locations and/or transported for loading into the appropriate computing device system. Execution of such code by a processor of the computing device enables the computing device to perform functions of receiving SU notifications and messages from the OTADM server 41, receiving the SU from the CDN server 39, providing status feedback to the OTADM server 41, receiving SU cancellation messages from the OTADM server, and canceling the SU from the computing device in a manner that is silent from the user, in essentially the manner performed in the implementations discussed and illustrated herein. Aspects of the subject technology are directed to a method. The method includes steps of: distributing a software update over the air to a first group of computing devices, from a server, through a wireless communication network; monitoring for successful installation of the software update installation in any of the first group of computing devices; upon determining that the software update is subject to a problem or potential problem, identifying from the monitoring of the first group of computing devices a second group of computing devices; and sending a software update cancellation message through the wireless communication network to the second group of computing devices, instructing the second group of computing devices to cancel the software update. In some aspects, the software update cancellation message is configured to cause each of the second group of computing devices to: cancel the software update installation without notification to a user of the respective computing device; and delete a user notification regarding the software update currently provided or not yet provided to the user of the respective computing device. In some aspects, the software update cancellation message is configured to cause each of the second group of computing devices to delete the software update upon determining that the respective computing device is (i) presently downloading or (ii) has already downloaded but not installed the software update. In some aspects, the software update cancellation message is configured to cause each of the second group of computing devices to: prevent an automatic or scheduled download of the software update without notification to a user of the respective computing device; and delete a user notification regarding the software update currently provided or scheduled to be provided to the user of the respective computing device. Aspects of the subject technology are directed to a method. The method includes steps of: receiving in a computing device over the air, from a server, through a wireless communication network, a notification of availability of a software update for the computing device; prior to starting installation of the software update after receiving the notification of availability of the software update, receiving a software update cancellation message over the air through the mobile communication network; and responsive to the software update cancellation message, stopping installation of the available software update without providing a user notification.

Hence, aspects of the methods of receiving and processing SUs as outlined above may be embodied in programming. Program aspects of the technology may be thought of as "products" or "articles of manufacture" typically in the form of executable code and/or associated data that is carried on or embodied in a type of non-transitory machine readable medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX

Acronym List

The description above has used a large number of acronyms to refer to various services, notification messages, and system components. Although generally known, use of several of these acronyms is not strictly standardized in the art. For the convenience of the reader, the following list correlates terms to acronyms, as used by way of example in the detailed description above.

| | |
|---|---|
| APN | Access Pointe Name |
| BS | Base Station |
| BTS | Base Transceiver System |
| CDN | Content Distribution Network |
| CPU | Central Processing Unit |
| DD | Download Descriptor |
| FOTA | Firmware Over The Air |
| ID | Identification |
| IP | Internet Protocol |
| MEID | Mobile Identification Identifier |
| MMSC | Multimedia Messaging Service Center |
| MTN | Mobile Telephone Number |
| OMA | Open Mobile Alliance |
| OS | Operating System |
| OTA | Over The Air |
| OTADM | Over The Air Data Management |
| PC | Personal Computer |
| PDA | Personal Digital Assistant |
| PDN | Packet Data Network |
| PGW | Packet Data Network Gateway |
| PROM | Programmable Read Only Memory |
| RAM | Random Access Memory |
| RAN | Radio Access Network |
| ROM | Read Only Memory |
| SMS | Short Message Service |
| SMSC | Short Message Service Center |
| SU | Software Update |
| UI | User Interface |
| URL | Uniform Resource Locator |
| WAN | Wide Area Network |
| WAP | Wireless Application Protocol |

What is claimed is:

1. A method comprising steps of:
   distributing a software update over the air to a first group of computing devices, from a server, through a wireless communication network;
   monitoring for successful installation of the software update installation in any of the first group of computing devices;
   upon determining that the software update is subject to a problem or potential problem, identifying from the monitoring of the first group of computing devices a second group of computing devices appropriately configured with respect to functions including receiving the software update, installing the software update, cancelling the software update, prioritizing messages, and receiving a confirmation from a user, wherein the second group of computing devices comprises only a subgroup of the first group of computing devices likely to be negatively affected by the software update and devices that plan to download or have downloaded the software update, the second group of computing devices containing fewer computing devices than the first group of computing devices; and
   sending a software update cancellation message through the wireless communication network to the second group of computing devices, instructing the second group of computing devices to cancel the software update, wherein the software update cancellation message includes instructions for the second group of computing devices to:
   cancel the software update installation without notifying a user of a respective computing device; and
   delete a user notification regarding the software update currently provided or not yet provided to the user of the respective computing device.

2. The method of claim 1, wherein the software update cancellation message includes instructions for the second group of computing devices to delete the software update upon determining that the respective computing device is (i) presently downloading or (ii) has already downloaded but not installed the software update.

3. The method of claim 1, wherein the software update cancellation message includes instructions for the second group of computing devices to:
   prevent an automatic or scheduled download of the software update without notification to a user of the respective computing device; and
   delete a user notification regarding the software update currently provided or scheduled to be provided to the user of the respective computing device.

4. The method of claim 1, wherein the first group of computing devices are of a predetermined make and model that are subscribed to receive software updates from the server.

5. The method of claim 4, wherein the second group of computing devices is a subset of the first group of computing devices comprising at least one of:
(i) one or more computing devices that have not completed downloading the software update or plan to download the software update; or
(ii) one or more computing devices that have not acknowledged completion of installation of the software update.

6. The method of claim 1, further comprising iteratively sending one or more additional software update cancellation messages to a specified member of the second group of computing devices until a confirmation that the software update was either installed or prevented from being installed at the specified member is received.

7. The method of claim 1, wherein the distribution of the software update and the cancellation thereof is transparent to the respective user of each computing device of the second group of computing devices.

8. The method of claim 1, wherein the software update cancellation message is sent by the server to the second group of computing devices via a short message system (SMS).

9. The method of claim 8, wherein the software update cancellation message is given highest priority over other SMS messages.

10. The method of claim 1, further comprising:
(a) identifying from a monitoring of a last group of computing devices a new group of computing devices based on the last group of computing devices that have not acknowledged installation of the software update;
(b) sending a software update cancellation message through the wireless communication network to the new group of computing devices, instructing the new group of computing devices to cancel the software update; and
(c) repeating steps (a) and (b) until all computing devices in the new group have at least one of:
(i) acknowledged installation of the software update; or
(ii) acknowledged that the software update has been canceled.

11. A method comprising steps of:
receiving in a computing device appropriately configured with respect to functions including receiving a software update, installing the software update, cancelling the software update, prioritizing messages, and receiving a confirmation from a user, over the air, from a server, through a wireless communication network, a notification of availability of a software update for the computing device;
after downloading the software update and prior to starting installation of the software update, receiving a software update cancellation message over the air through the mobile communication network, the software update cancellation message being transmitted to the computing device based on a determination that the computing device is likely to be negatively affected by the software update; and
responsive to the software update cancellation message, stopping installation of the available software update without providing a user notification, wherein the software update cancellation message includes instructions for the computing device to:
cancel the software update installation without notification to a user of the computing device; and
delete a user notification regarding the software update currently provided or not yet provided to the user of the computing device.

12. The method of claim 11, wherein stopping installation of the available software update includes at least one of:
(i) stopping a download of the software update already in progress;
(ii) preventing a download of the software update; or
(iii) preventing installation of the software update after completion of downloading.

13. The method of claim 11, wherein, if the notification of the software update has not yet been provided to the user of the mobile device when the software update cancellation message is received, the step of stopping installation includes preventing presentation of the notification of the software update.

14. The method of claim 11, further comprising deleting a user notification regarding the software update currently provided or not yet provided to the user of the computing device.

15. The method of claim 11, further comprising deleting the software update upon determining that the software update is (i) presently downloading or (ii) has already downloaded but not installed in the computing device.

16. The method of claim 11, further comprising sending a first acknowledgment message to the server upon determining that (i) the software update cancellation message is received after a download of the software update has completed, but (ii) before the installation of the software update is started.

17. The method of claim 16, further comprising sending a second acknowledgment message to the server if the software update cancellation message is received (i) before a deferred download of the software update has completed, but (ii) before the installation of the software update is started, wherein the second acknowledgment is different from the first acknowledgment.

18. The method of claim 11, wherein the software update cancellation message is received from the server via a short message system (SMS).

19. A computing device, comprising:
a processor;
a network interface coupled to the processor configured to enable communications via a wireless communication network;
a non-transitory computer-readable storage device storing instructions which, when executed by the processor, cause the processor to:
receive over the air, from a server, through the wireless communication network, a notification of availability of a software update for the computing device;
receive a software update cancellation message over the air through the mobile communication network, the software update cancellation message being transmitted to the computing device based on a determination that the computing device is likely to be negatively affected by the software update; and
responsive to the software update cancellation message, perform at least one of the following without providing a user notification:
upon determining that the software update cancellation message is received after the software update has already been installed, send a first message to the server;
upon determining that the software update cancellation message is received during installation of the software update, complete the installation and send a second message to the server;

upon determining that the software update cancellation message is received after completion of a download of the software update but before installation of the downloaded software update, delete the downloaded software update and send a third message to the server; and upon determining that the software update cancellation message is received before initiation of a deferred download of the software message, prevent the download of the software update and send a fourth message to the server, wherein the software update cancellation message includes instructions for the processor to:

cancel the software update installation without notification to a user of the computing device; and delete a user notification regarding the software update currently provided or not yet provided to the user of the computing device.

20. The computing device of claim 19, wherein the first message to the server is the same as the second message to the server.

\* \* \* \* \*